United States Patent [19]

Bussey, III et al.

[11] Patent Number: 5,506,048
[45] Date of Patent: Apr. 9, 1996

[54] INSULATION BARRIER AND A METHOD OF MAKING A FIRE-RETARDANT INSULATION BARRIER

[75] Inventors: Harry Bussey, III, Locust, N.J.; Harry Bussey, Jr., Marco Island, Fla.; Burton P. Gendron, Marietta, Ga.

[73] Assignee: Insul-Stop, Inc., Marlboro, N.J.

[21] Appl. No.: 393,283

[22] Filed: Feb. 23, 1995

[51] Int. Cl.$^6$ .................................................. B32B 27/00
[52] U.S. Cl. .................... 428/319.3; 52/309.6; 52/309.8; 427/244; 427/393.5; 428/319.7
[58] Field of Search .................. 52/309.4, 309.6, 52/309.8, 309.9; 264/46.4, 46.5; 422/244, 393.5; 428/319.3, 319.7, 319.9; 521/139, 146

[56] References Cited

U.S. PATENT DOCUMENTS

| | | | |
|---|---|---|---|
| 4,224,374 | 9/1980 | Priest | 427/244 X |
| 4,687,534 | 8/1987 | Alford et al. | 428/319.9 X |
| 5,114,773 | 5/1992 | Bogdany | 427/244 X |
| 5,362,436 | 11/1994 | Wagner | 428/319.9 X |

*Primary Examiner*—Michael Lusignan
*Attorney, Agent, or Firm*—McAulay Fischer Nissen Goldberg & Kiel

[57] ABSTRACT

The process of making a fire-retardant insulation barrier provides a single step of applying an emulsion comprised of aluminum trihyridate and polyvinylchloride to one side of a foamed molded or extruded or fabricated polystyrene board. After the emulsion dries to a coating, the board can be shipped. The aluminum trihydrate and polyvinylchloride are in a ratio of approximately 4 to 1 to 1 to 4 and the emulsion is applied at a wet weight of 1 to 6 pounds per 32 square feet of board area.

14 Claims, No Drawings

INSULATION BARRIER AND A METHOD OF MAKING A FIRE-RETARDANT INSULATION BARRIER

This invention relates to an insulation barrier and a method of making a fire-retardant insulation barrier.

As is known, foamed polystyrene panels have been used for insulation purposes in various environments. In particular, it has been known to impregnate polystyrene panels with fire-retardant emulsions in order to provide a panel with a fire-resistant rating. For example, it has been known to provide an insulation barrier of foamed polystyrene having sodium silicate impregnated therein and having a protective coating on at least one surface of the body including a metallic-based inorganic material such as aluminum oxide hydridrate. Typically, in order to make such a barrier, the body of foamed polystyrene is formed with a plurality of recesses in at least one surface and then impregnated with a solution of sodium silicate and a wetting agent. In accordance with the process, the solution of sodium penetrates into the recesses and permeates into the interior of polystyrene body. After impregnation, the body is dried and an emulsion of a metallic based inorganic material, for example, a hydrated alumina and a latex, such as, a polyvinylchloride is applied to the surface of the body followed by drying in order to form a protective coating on the impregnated body.

However, this known process has several disadvantages. For example, the process requires an impregnating solution. Such an impregnating solution can be driven through the thickness of the polystyrene body reducing the surface protection. Furthermore, the use of an impregnating solution and particularly one including sodium silicate requires an extra step in production as well as a separate drying step. The use of the impregnating solution and sodium silicate therein makes the overall process expensive and can cause undesirable changes in the polystyrene body.

From an environmental standpoint, the use of the impregnating solution of sodium silicate involves a need for clean-up and disposal of waste. Further, the use of an impregnating solution requires the polystyrene body to be subjected to a forming step in which recesses can be made in the surface of the polystyrene body. This leads to increased costs and labor in order to effect the process.

Accordingly, it is another object of the invention to provide a low cost process for producing an insulation barrier of foamed polystyrene with a fire-retardant coating.

It is another object of the invention to reduce the overall costs of obtaining a fire-retardant foamed polystyrene board.

It is another object of the invention to reduce the weight of a fire-retardant foamed polystyrene board.

It is another object of the invention to minimize the steps required to provide a fire-retardant coating on a foamed polystyrene board.

Briefly, the invention provides an insulation barrier which is comprised of a panel-shaped board of molded or extruded polystyrene or of any other fabricated form and a coating applied directly on one side or on both sides of the board wherein the coating is formed of a combination of aluminum trihydrate and polyvinylchloride (PVC) in a ratio of from approximately 4 to 1 to 1 to 4. In addition, the coating is applied to the board in an amount of from 1 to 6 pounds per 32 square feet of surface area of the board in a wet state.

The method of making the fire-retardant insulation barrier includes an initial step of obtaining a body of foamed polystyrene. In this respect, the body of foamed polystyrene may be of open cell type or of closed cell type. Further, the board may be a molded board or an extruded board or of any other fabricated form.

Thereafter, an emulsion is applied directly to one side or both sides of the polystyrene body without the intermediary of an impregnating solution. This emulsion is comprised of aluminum trihydrate and polyvinylchloride in a ratio of from 4 to 1 to 1 to 4 and preferably in a ratio of 2 to 1. In addition, the coating is applied at a wet weight rate of 1 of 6 pounds per 32 square feet of area of the side of the board.

After application of the emulsion, the body of polystyrene is dried so that the applied emulsion forms a coating on the board. Drying may be carried out in a drying oven or may be carried out in air, for example, during an overnight period where time is not important.

It has been found that the need for an impregnating solution such as in previously known techniques is eliminated. Likewise, the need for the formation of recesses in the polystyrene board can be eliminated where desired. Instead, the emulsion of aluminum trihydrate and polyvinylchloride can be directly applied to the untreated foamed polystyrene board.

The coating is applied on one side or both sides of the board in a relatively simple manner in a continuous in-line manner or on a batch-to-batch manner.

The use of a single emulsion allows the board to dry faster while providing for better protection. In addition, there is an overall reduced weight in the final product as well as a reduced cost in the fabrication of the product.

The process may be carried out in a single step using a single coating machine, for example, the board can be passed between a pair of coating rollers so that each of two opposite sides of the board can be coated.

In view of the fact that the process uses a relatively simple emulsion which is applied in a one-step manner, there is relatively little waste to be eliminated. Further, it has been found that the coated board is relatively easy to handle.

Overall, the process for making the fire-retardant insulation barrier uses less materials than previously known techniques as well as using less energy in order to produce the barrier.

The following represents a comparison between a board manufactured in accordance with a previously known technique and the technique of the invention. In this respect, example 1 represents the prior art and example 2 represents the invention.

EXAMPLE 1

A number of 4ft×8ft×2 inches EPS boards (i.e. 480 molded boards) were provided with a plurality of recesses with a suitable penetrating tool. Thereafter, an impregnating solution of hydrated alumina with a wetting agent was applied to the top surface of the boards at a wet weight of 3 pounds per board.

The boards were then dried overnight, and, thereafter, an emulsion consisting of aluminum trihydrate and polyvinylchloride was applied to the boards. This emulsion was applied at a wet weight of 2 pounds per board. These boards were also dried overnight and thereafter were shipped after two days.

EXAMPLE 2

A EPS board having dimensions of 4ft×8ft×2 inches was fabricated from a molded board having a larger thickness, for example, 20 inches. In this respect, after obtaining the molded board, the board was sliced, for example, using a hot wire or saw so as to slice the molded board into thinner thicknesses each of a two inch thickness. The resulting fabricated board was subjected to a single coating step in which an emulsion of aluminum trihydrate and polyvinylchloride was applied to only one side of the board. The emulsion was applied at a wet weight of 3 pounds per board. Thereafter, the board was allowed to dry overnight.

The EPS board had substantially smooth uninterrupted surfaces, that is, the board was not subjected to the penetrating step in which recesses were formed in the board as was the case with the boards of Example 1. Likewise, there was no impregnation of the board with a sodium and wetting agent silicate solution.

Comparing the boards made in accordance with Example 1 and the board made in accordance with Example 2 shows several advantages of the board of Example 2. These advantages are enumerated above.

The invention thus provides an improved process for producing fire-retardant insulation barriers of foamed polystyrene boards.

The invention further provides an improved fire-retardant insulation barrier which is relatively inexpensive to manufacture and which is easily handled.

What is claimed is:

1. An insulation barrier comprising
   a panel-shaped board of foamed polystyrene; and
   a coating directly on at least one side of said board, said coating comprising effective film forming amounts of aluminum trihydrate and polyvinylchloride.

2. An insulation barrier as set forth in claim 1 wherein said aluminum trihydrate and said polyvinylchloride are in a ratio of 2 to 1.

3. An insulation barrier as set forth in claim 1 wherein said aluminum trihydrate and said polyvinylchloride are in a ratio of from 4 to 1 to 1 to 4.

4. An insulation barrier as set forth in claim 1 wherein said coating is in an amount of from 1 pounds to 6 pounds per 32 square feet of said side of said board in a wet state thereof.

5. An insulation barrier as set forth in claim 1 wherein said coating is in an amount of from 3 to 3½ pounds per 32 square feet of board surface.

6. An insulation barrier sa set forth in claim 1 wherein said side of said board has a substantially smooth uninterrupted surface.

7. An insulation barrier as set forth in claim 1 wherein said board is selected from one of open cell expanded polystyrene and closed cell expanded polystyrene.

8. An insulation barrier as set forth in claim 1 wherein said board is one of a molded board, an extruded board and a fabricated board.

9. A method of making a fire-retardant insulation barrier comprising the steps of
   obtaining a body of foamed polystyrene;
   applying an emulsion directly to at least one side of said body, said emulsion comprising effective film forming amounts aluminum trihydrate and polyvinylchloride; and
   drying the applied emulsion to form a coating on said side of said board.

10. A method as set forth in claim 9 wherein said emulsion is applied at a wet weight rate 1 to 5 pounds per 32 square feet of area of said side of said board.

11. A method as set forth in claim 10 wherein said aluminum trihydrate and said polyvinylchloride are in a ratio of 2 to 1.

12. A method as set forth in claim 10 wherein said aluminum trihydrate and said polyvinylchloride are in a ratio of from 4 to 1 to 1 to 4.

13. A fire-retardant insulation barrier comprising:
    a panel-shaped board of foamed polystyrene; and
    a fire-retardant coating directly on at last one side of said board, said coating being formed of a combination of aluminum trihydrate and polyvinylchloride, wherein said aluminum trihydrate and said polyvinylchloride are in a ratio of from 4 to 1 to 1 to 4.

14. A fire-retardant insulation barrier as set forth in claim 13 wherein said coating is in an amount of from 1 pounds to 6 pounds per 32 square feet of said side of said board in a wet state thereof.

* * * * *